United States Patent [19]

DePriester

[11] 4,026,378
[45] May 31, 1977

[54] ELECTRIC LIFT TRUCK BODY CONSTRUCTION

[75] Inventor: Donald J. DePriester, Niles, Mich.

[73] Assignee: Clark Equipment Company, Buchanan, Mich.

[22] Filed: Nov. 28, 1975

[21] Appl. No.: 636,246

[52] U.S. Cl. .................. 180/68.5; 214/127; 214/DIG. 7; 280/755; 280/756

[51] Int. Cl.² ...................................... B60R 18/02

[58] Field of Search .......... 180/68.5; 280/755, 756, 280/759; 105/50, 51; 214/127, DIG. 7

[56] References Cited

UNITED STATES PATENTS

| | | | |
|---|---|---|---|
| 1,291,581 | 1/1919 | Mancha | 105/50 |
| 2,263,981 | 11/1941 | Dalecke et al. | 214/DIG. 7 |
| 2,774,498 | 12/1956 | Cordes et al. | 214/731 |
| 3,029,088 | 4/1962 | Loef | 280/759 |
| 3,217,825 | 11/1965 | Hauxweil et al. | 180/68.5 |
| 3,259,211 | 7/1966 | Ryskamp | 280/756 |
| 3,367,441 | 2/1968 | Schuster et al. | 180/68.5 |
| 3,497,090 | 2/1970 | Daniels | 180/68.5 |
| 3,721,353 | 3/1973 | Erickson | 180/68.5 |
| 3,762,761 | 10/1973 | Erickson | 280/756 |
| 3,853,231 | 12/1974 | Luttrell | 280/759 |

*Primary Examiner*—Joseph F. Peters, Jr.
*Assistant Examiner*—David M. Mitchell
*Attorney, Agent, or Firm*—J. C. Wiessler

[57] ABSTRACT

A battery powered lift truck of the sit-down type in which two main power source batteries are located in a stepped compartment so that the forward battery is supported at a lower elevation than the rear battery. The lower elevation of the forward battery enables relatively increased stability by lowering the center of gravity of the lift truck, while the higher elevation of the rear battery is effected by locating a horizontal counterweight in an elevated position above the rear steer axle and linkage and using it as the rear battery platform, whereby to effect a relatively short length truck with adequate stability and a relatively short turning radius. An overhead guard is relatively short in length which enables the direct installation and removal of both batteries without detaching or dismounting the guard from the truck.

13 Claims, 3 Drawing Figures

ELECTRIC LIFT TRUCK BODY CONSTRUCTION

BACKGROUND OF THE INVENTION

The field of art to which this invention relates includes vehicle body structure and protective guards.

In electric lift trucks of the sit-down, front wheel drive rider type it has been customary to provide a single large main battery power source located forwardly of a rear counterweight, and sometimes also between side mounted counterweights, adjacent the front end of which battery in overlying relation is conventionally located a pivoted operator's seat member at or adjacent the operator's station. Usually an overhead protective guard is connected at four points forwardly and rearwardly of the truck with provisions for installation and removal of the battery without detachment of the guard from the truck and by manipulation of the operator's seat to a non-interfering relation to the battery. One such structure is disclosed in U.S. Pat. No. 3,687,484. Another structure utilizing a pivoted T-shaped guard connected to the truck at two points and having a combined battery and counterweight rearwardly thereof removable as a unit from the truck is disclosed in U.S. Pat. No. 3,762,761.

SUMMARY

A body construction for electric lift trucks having forward and rearward adjacent battery support platforms, the forward platform being at a lower elevation than the rear platform, a counterweight located at the rear platform and above rear steer axle and linkage, an operator's station adjacent the forward platform, and a driver's overhead guard of such a length and location as to permit the independent installation and removal on the platforms of two main power source batteries without adjustment or removal of the guard.

A primary object of the invention is to provide an improved electric truck body structure utilizing a stepped battery platform structure for supporting two batteries at different elevations so as to accommodate counterweight beneath the higher battery and above the steer axle which enables a truck having a relatively short length.

Another object is to provide a combination of truck body structure, batteries, and driver's overhead guard so that a relatively short length and low height guard may be utilized providing a relatively low truck profile and enabling direct removal of a pair of main power source batteries without detachment or adjustment of the guard, the batteries being mounted in longitudinal relation in the body structure at different elevations with counterweight secured adjacent the rear and elevated battery enabling a relatively short length truck.

Other objects and features of the invention will be apparent to those skilled in the art from the following description and drawing forming a part hereof.

DESCRIPTION OF THE PREFERRED EMBODIMENT

Figure 1:
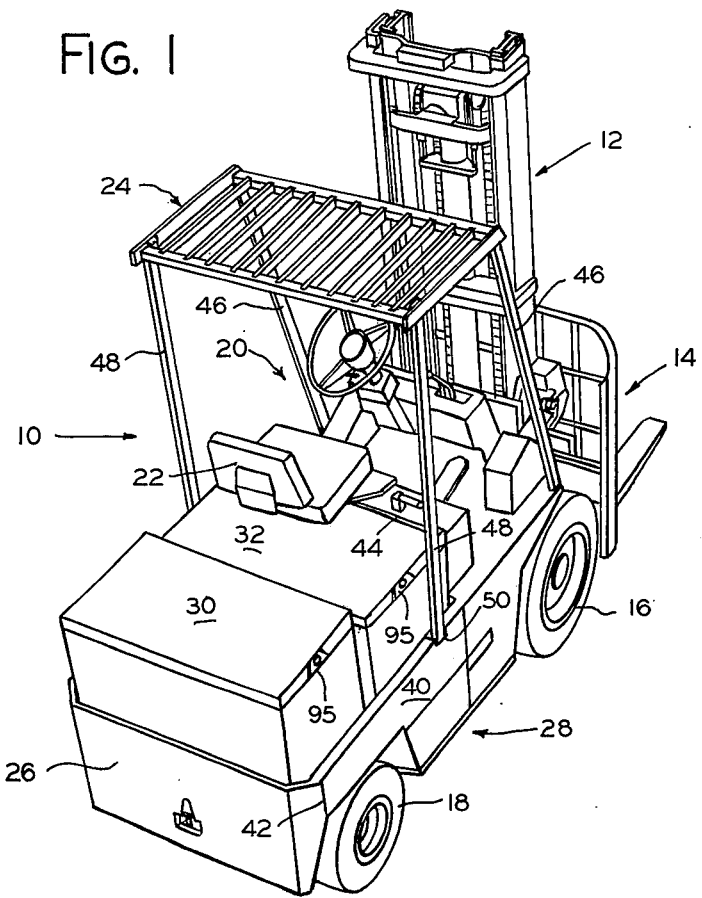
FIG. 1 is a perspective view of an electric sit-down rider type lift truck taken from an elevated right rear-quarter position.
Figure 2:
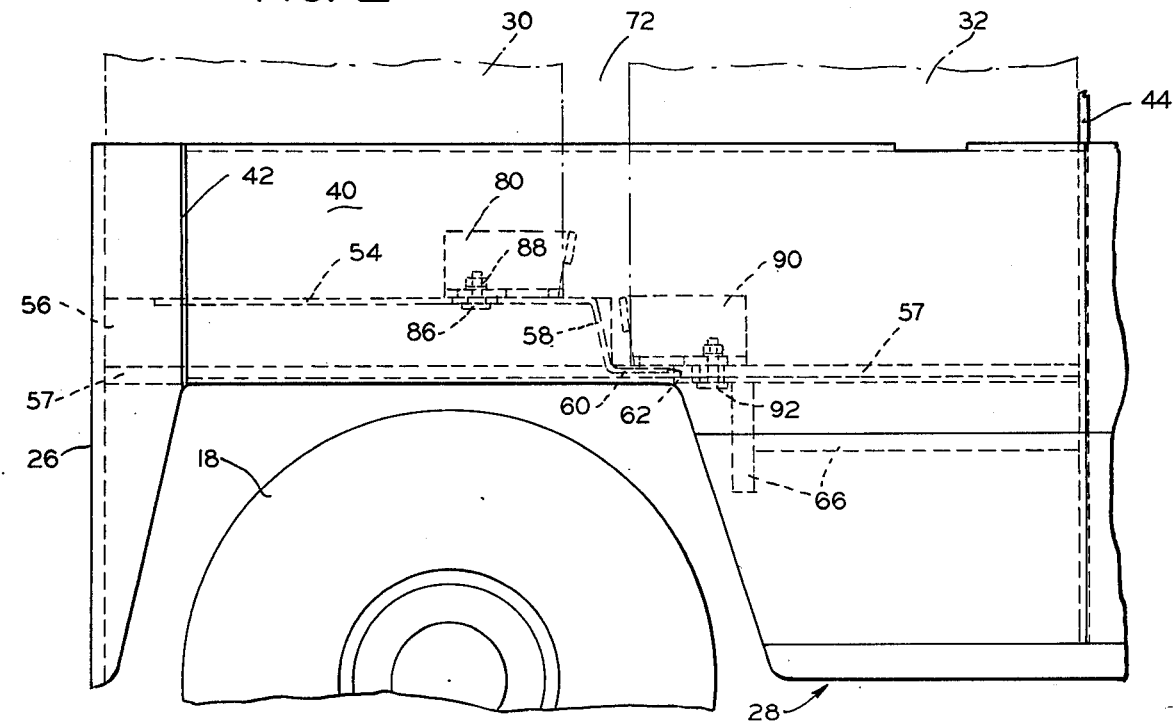
FIG. 2 is a side view in elevation showing the rear body structure of the truck.
Figure 3:
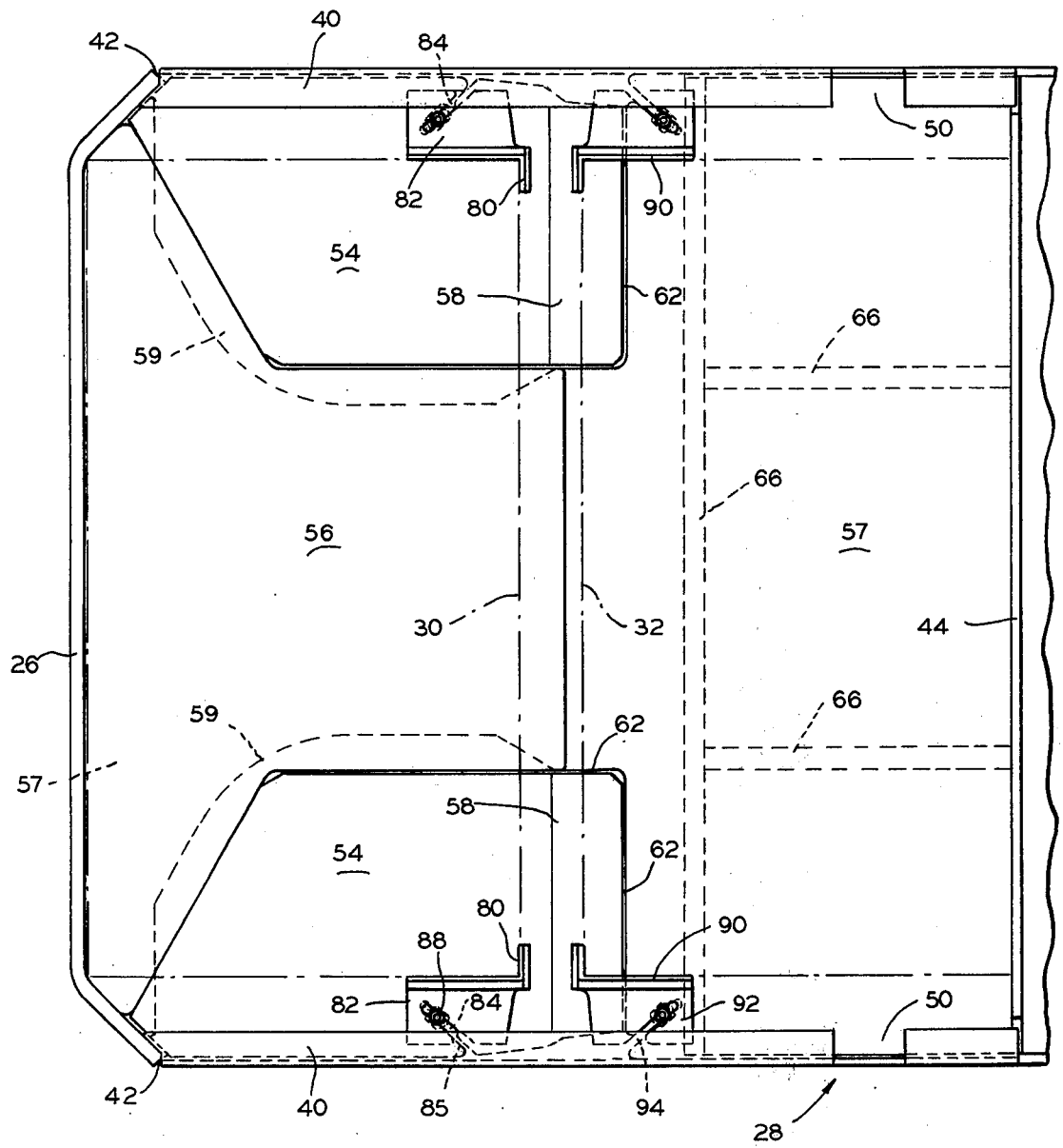
FIG. 3 is a plan view of FIG. 2.

Referring now to the drawing, numeral 10 designates an electric counterbalanced lift truck which includes a lifting mast assembly 12 mounted from the front axle of a generally conventional design having a lifting carriage and fork 14 mounted for vertical movement thereon, forward drive wheels 16, rear steer wheels 18 supported from a conventional steering axle and connected by conventional steering linkage, not shown, an operator and control station 20 formed in the forward portion of the truck, an operator's seat 22, a protective overhead guard 24, a rear body plate 26, a rear body structure 28, and a pair of main power source electric storage batteries 30 and 32 supported in the rear truck portion at different elevations as shown.

The rear body structure comprises in addition to the rear plate 26, side plates 40 on opposite sides secured to the rear counterweight at 42, 42, and a transverse forward plate 44 which is connected to the side plates and extends across the truck. The side plate structure extends forwardly of the battery compartment, as shown in FIG. 1, with plate 44 and rear plate 26 secured as by welding to the side plates. The operator's seat 22 is pivotally mounted in known manner from plate 44 so that it may be pivoted forwardly of battery 32 during battery installation and removal. The overhead guard is secured to the body structure at the forward end by means of a pair of depending legs 46 and at the rear end by means of legs 48 in pockets 50 formed in the side plates rearwardly of plate 44.

Battery 30 is located on a rear elevated platform comprised of pair of substantially coplanar mud shields 54 and a generally T-shaped intermediate coplanar counterweight member 56. A frame support plate 57 to which counterweight 56 is secured, as by welding, extends through the area bounded by plate members 26, 44 and 40, 40, except for flame cut portions 59 which receive and permit dirigible movement of steer wheels 18. The plate members 26, 40 and 44 are all secured, as by welding to frame plate 57. The front ends of shields 54 are turned downwardly and forwardly at 58 and 60, respectively, being secured at 62 to the front parts of the flame cut portions 59. The counterweight 56 is mounted on frame plate 57 between mud shields 54 as shown, and is of such thickness as to provide with the shields the elevated coplanar rear battery support platform as shown. Transverse and longitudinal structural body members 66 are located beneath the front portion of support plate 57.

The compartment for the batteries is preferably of sufficient size to readily accommodate a pair of batteries as shown in FIG. 1, with a variable space 72 therebetween to facilitate installation and removal thereof, and to accommodate different sizes of batteries. When the batteries are correctly located, rear battery 30 is on the rear platform 54, 56 and in abutment with the inside surface of the rear plate 26. It is maintained in that position by a pair of adjustable right angle brackets 80, each of which includes an outwardly extending flange 82 having a diagonal slot 84 for receiving a threaded bolt 86 which is secured in an aligned slot 85 in shield 54, a nut 88 being adapted to engage the bolt so that the respective bracket 80 may be adjusted along diagonal slot 85 so as to tightly engage each forward corner of battery 30. Likewise, another pair of brackets 90 are similarly constrcted and located in allochiral relation to brackets 80 for adjustably engaging the rear corners of forward battery 32, the bolts 92 associated therewith extending through adjacent diagonal slots in each bracket and in frame plate 57, the latter slot being shown at 94. Sling-eye brackets 95 are located on each side of each battery so that overhead cranes, and the like, can readily engage and lift and lower the batteries during removal and installation thereof.

As will now be readily appreciated, battery 32 is located on platform 57 at a substantially lower level than is battery 30 when it is located on the rear platform 54, 56, the elevational difference being the height of the counterweight as illustrated. The adjustable brackets 80 permit battery 30 to be securely engaged in the rear battery compartment between the brackets and the inside surface of rear counterweight 26, while brackets 90 securely engage battery 32 in the front compartment with forward trasverse plate 44 a sufficient space 72 is provided between the engaged batteries to enable convenient handling thereof as aforesaid. Also, if desired, space 72 and adjustable brackets 80 and 90 enable the compartment to receive batteries of a different size than are illustrated.

The stepped relationship between the forward and rear support platforms lead to a number of advantageous results. As already noted, the arrangement which permits the addition of counterweights in a horizontal plane within the body of the truck to form a battery platform reduces the truck length required heretofore for a given lifting capacity, thereby enabling a shorter turning radius than heretofore. At the same time a relatively low center of gravity and low overall truck profile is enabled by the stepped-down location of the forward battery on platform 57, thereby improving overall truck stability. Of course, the center of gravity of the operator is also lowered by virtue of the relatively low elevation of battery 32, and the resulting lower required height of the overhead guard contributes to that extent to the relatively low truck profile in such a truck. The relatively short length of the four point support overhead guard enables the batteries to be installed and removed without detaching or adjusting the guard.

To remove the batteries, the seat 22 is pivoted forwardly over the steering wheel and, following disengagement of brackets 80 and 90, battery 30 is first removed by an overhead hoist or the like, following which battery 32 may be removed by elevating it between overhead guard legs 48 above the rear platform 54, 56, and then moving the battery rearwardly and upwardly out of the envelope of the truck. To install the batteries the above procedure is, of course, reversed to first accommodate battery 32 on the forward platform and then battery 30 on the rear platform, following which brackets 80 and 90 are adjusted to engage the batteries as aforesaid.

It will be apparent to persons skilled in the art that various changes in the structure and relative arrangement of parts may be made without necessarily departing from the scope of my invention.

I claim:

1. In an electric lift truck of the sit-down rider type having rear steer wheels and a transverse steering axle, a battery compartment, an operator's station located forwardly of said battery compartment, and first and second main power source batteries located in forward and rearward portions of said compartment, said compartment including a substantially horizontal and longitudinally extending battery support platform and substantially horizontal and longitudinally extending counterweight means located and supported upon the rear portion of said platform, said first battery being located and supported upon the forward portion of said platform at a relatively low elevation in said compartment and said second battery being located and supported upon said counterweight means at an elevation higher than said first battery means.

2. An electric lift truck as claimed in claim 1 wherein said counterweight means is located above the steering axle.

3. An electric lift truck as claimed in claim 1 wherein an overhead guard extends over the operator's station and is connected both at the front and middle portions of the truck, the connection at the middle portion being located adjacent the first battery whereby the relatively low elevation of said first battery enables a relatively low height of the overhead guard and of the operator's station.

4. An electric lift truck as claimed in claim 3 wherein the connection at the middle portion is located adjacent the forward end of the first battery.

5. An electric lift truck as claimed in claim 3 wherein the batteries are removable from the compartment in the order of the second battery and the first battery, said batteries being installed in the compartment in the reverse order, without detaching the overhead guard from its connections to the truck.

6. An electric lift truck as claimed in claim 1 wherein said steer wheels are located adjacent the sides of said counterweight means, whereby the location of the platform and of the counterweight means combine with the repective low and high elevations of said batteries to enable a relatively short length and low profile truck.

7. An electric lift truck as claimed in claim 1 wherein adjustable bracket means are adapted to retain said first and second batteries in longitudinally spaced relation to each other.

8. An electric lift as claimed in claim 1 wherein vertically extending front, rear and side truck body members form with said support platform and counterweight means the battery compartment, said platform being secured to at least some of said truck body members.

9. An electric lift truck as claimed in claim 1 wherein said counter weight means is of a generally T-shaped configutation.

10. An electric lift truck as claimed in claim 1 wherein said platform is shaped in the area of said steer wheels to permit dirigible movement thereof.

11. An electric lift truck as claimed in claim 9 wherein a pair of mud shields are secured in the battery compartment to extend over the steer wheels on opposite sides of said counterweight means and in substantially coplanar relation therewith to provide additonal supporting surfaces for the second battery.

12. An electric lift truck as claimed in claim 7 wherein said bracket means are adjustable to accommodate first and second batteries of different sizes by engaging the confronting corner portions of the respective batteries.

13. An electric lift truck as claimed in claim 1 wherein said steer wheels are located adjacent the sides of said counterweight means, whereby the position of the counterweight means enables a relatively short truck length and turning radius, and the relatively low elevation of said first battery enables a relatively low center of gravity and profile of the operator's station.

* * * * *